Nov. 10, 1931.     R. S. HEISE     1,831,110
REMOVABLE HEATING UNIT
Filed Sept. 29, 1928     2 Sheets-Sheet 1

Inventor:
Roscoe S. Heise,
By Banning + Banning
Attys.

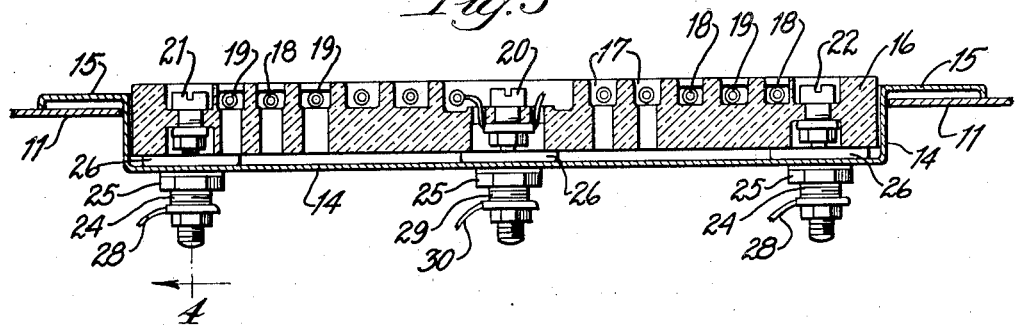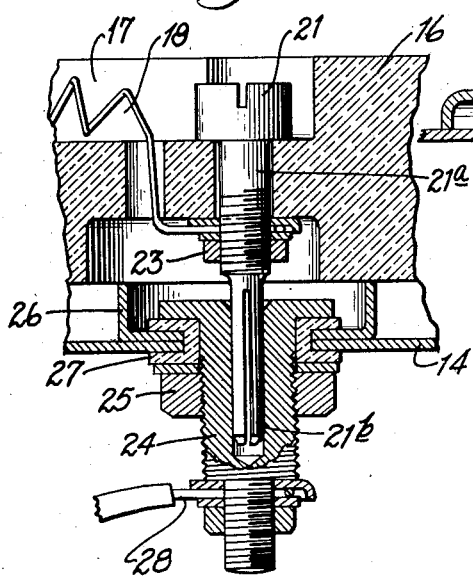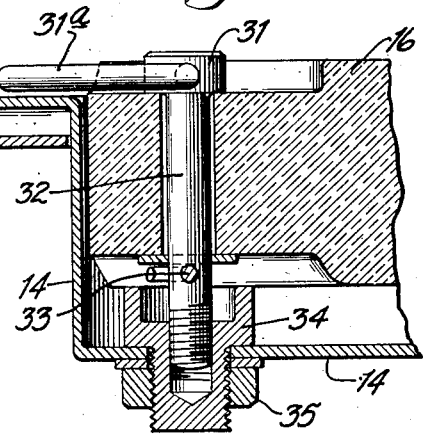

Patented Nov. 10, 1931

1,831,110

UNITED STATES PATENT OFFICE

ROSCOE S. HEISE, OF DAYTON, OHIO

REMOVABLE HEATING UNIT

Application filed September 29, 1928. Serial No. 309,275.

This invention relates to a removable heating unit for electric ovens, stoves, and the like.

An object of the invention is to provide a heating unit which can be readily removed from an electric oven so as to permit of being cleaned, and which can be readily inserted therein without the use of any tools whatever.

This and other objects, as will hereinafter appear, are accomplished by this invention which is fully described in the following specification and shown in the accompanying drawings, in which—

Fig. 3 is an enlarged transverse section on line 3 of Fig. 2;

Fig. 4 is a partial enlarged section on line 4 of Fig. 3; and

Fig. 5 is a similar section on line 5 of Fig. 2.

Figure 1:
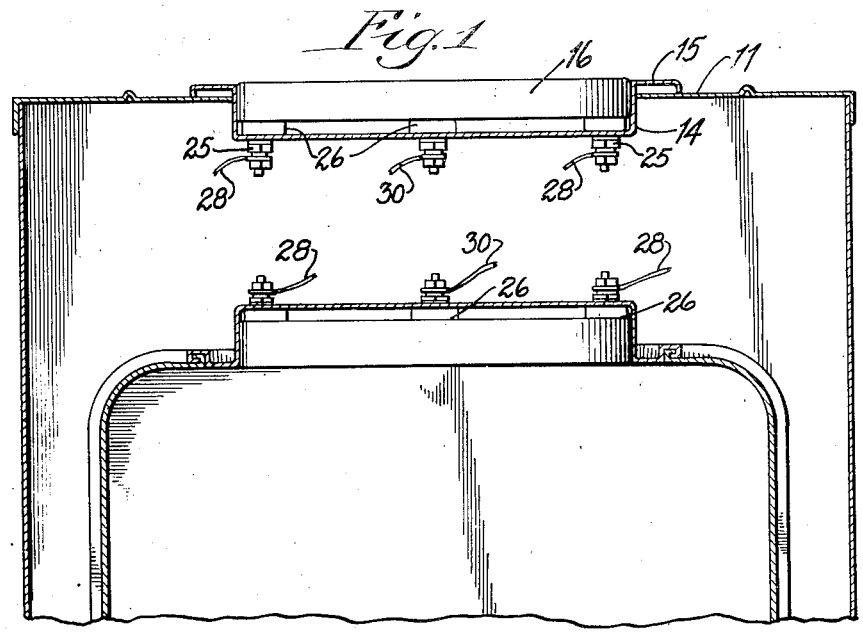
Figure 1 is a partial vertical section through the upper portion of an electric oven embodying the invention.
Figure 2:
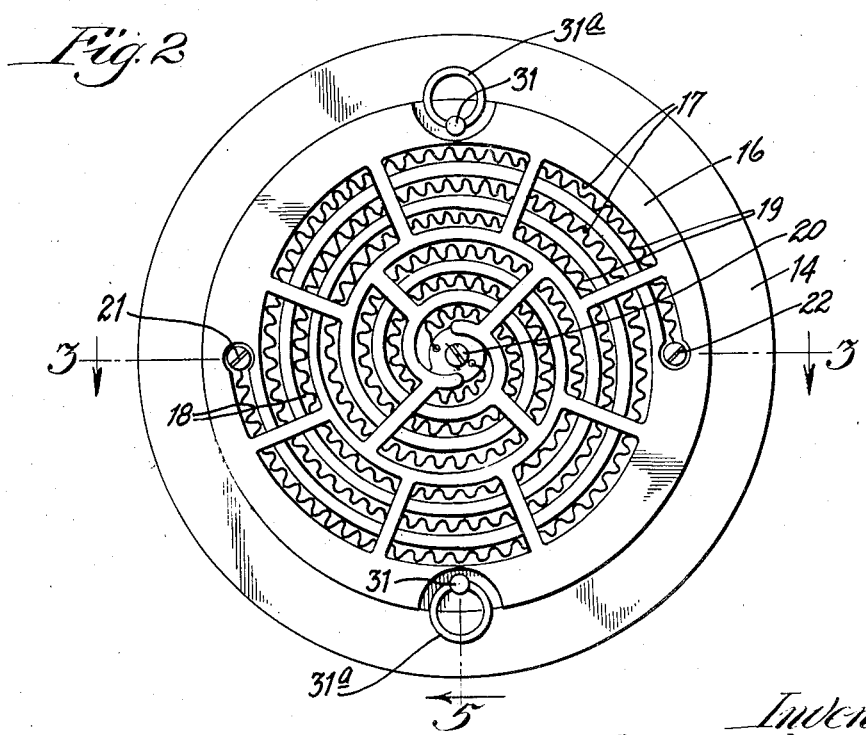
Fig. 2 is a front elevation of a heating unit.

The embodiment illustrated is adapted to be used in an electric oven of the type shown and described in my pending application, Serial No. 121,145, filed July 8, 1926, in which there is a housing 10 having a top 11 enclosing a sheet metal oven lining 12 suitably supported within the housing and heat-insulated therefrom. The top 11 has an opening 13 in which is seated a shallow pan having an outwardly and downwardly extending rim 15 which rests upon the top 11. The pan 14 is preferably circular in form to receive a circular heating unit 16 made of a suitable refractory material, and having a series of spiral grooves 17 in which are located electric resistance heating elements 18 and 19 of any well known character. These two resistance elements 18 and 19 are secured at the center to a contact 20 and at the ends to contacts 21 and 22 respectively. The contacts 20, 21 and 22 are similar so that a description of one serves for the others.

The contact 21 is shown in detail in Fig. 4 and consists of an upper portion 21ª which is screw-threaded to receive a nut 23, while the end 21ᵇ of the screw is reduced in diameter and split so as to yieldingly enter and make contact with a socket 24. This socket is threaded to receive a nut 25 and passes through the pan 14 and through a cup 26 which is turned upwardly for a purpose later to be explained.

The socket 24 is insulated from the pan 14 and cup 26 by means of a suitable insulator 27 and is connected to a wire 28 with a suitable source of electric current. Similarly the metal contact 20 makes contact with a similar socket 29 which, in turn, is connected to a wire 30 with the other lead of the circuit 28, so that an electric circuit may be established through the wire 18.

Thus it will be seen that the heating unit 16 may be removed by lifting it bodily, thereby removing the three electric contacts or terminals 20, 21 and 22 from their corresponding sockets 24 and 29. For the purpose of the top heating plate in Fig. 1, gravity might serve to retain this heating element in place. The heating element B in the top of the electric oven will require some positive holding means. I, therefore, provide all of the units with cap screws 31 loosely held in openings 32 in the refractory heating element 16 by any suitable means, such as a wire 33 inserted through the screw 31. This screw engages a thread in a nut 34 which in turn has a projection passing through an opening in the pan 14 and secured thereto by means of a nut 35.

In order to insert this heating unit, the split lower ends of the terminals 20, 21 and 22 are inserted into the three sockets 24 and 29 and pressed down, thereby bringing the cap screws 31 into alignment with the nuts 34. For convenience, the terminals, cap screws and nuts are made symmetrical, so that the heating unit may be in either of two positions. Having once been inserted, the cap screws 31 are screwed down by means of rings 31ª hingedly secured therein.

It sometimes happens that liquid will get into the bottom of one of the pans 14. In order to prevent this liquid coming into contact with the terminal 21 and socket 24, I have provided an upwardly extending cup 26 which prevents this liquid from getting to the contact terminals and at the same time serves as a means for centering these terminals while the heating unit is being inserted.

It will thus be observed that I have provided a simple and efficient means for inserting and removing the heating units, so that they can be readily removed for inspection or cleaning and quickly replaced in an electric oven. This will also enable the parts to be readily interchangeable.

While I have shown and described but a single embodiment of this invention, it is to be understood that it is capable of many modifications. Changes, therefore, in the construction and arrangement may be made with do not depart from the spirit and scope of the invention as disclosed in the appended claims.

I claim:

1. In a device of the class described, a refractory plate or block, a heating element carried thereby, a plurality of electrical terminals for said heating element carried by said plate, a mounting for said plate comprising electrical contacts each of which is adapted to make a removable contact with one of said electrical terminals, cups surrounding said electrical contacts for preventing liquid from the sides reaching said contacts, and means for securing said plate in said mounting.

2. In a device of the class described, a refractory plate or block, a heating element carried thereby, a plurality of electrical terminals for said heating element carried by said plate, a mounting for said plate comprising a shallow metal pan having therein a series of electrical contacts each of which is adapted to make a removable contact with one of said electrical terminals, cups surrounding said electrical contacts and having upwardly turned edges to prevent liquid in said metal pan from flowing into contact with said electrical contacts, and means for securing said plate in said mounting.

3. In a device of the class described, a refractory plate or block, a heating element carried thereby, a plurality of electrical terminals for said heating element carried by said plate, a mounting for said plate comprising electrical contacts each of which is adapted to make a removable contact with one of said electrical terminals, and cups surrounding said electrical contacts for preventing liquid from the sides reaching said contacts.

4. In a device of the class described, a refractory plate or block, a heating element carried thereby, a mounting for said plate carrying electrical contacts adapted to be connected to a source of current, a plurality of electrical terminals for said heating element adapted to make electrical connection with said contacts, and cups surrounding said electrical contacts for preventing liquid from the sides reaching said contacts.

5. In a device of the class described, a refractory plate or block, a heating element carried thereby, a mounting for said plate carrying electrical contacts adapted to be connected to a source of current, a plurality of electrical terminals for said heating element adapted to make removable electrical connection with said contacts, and cups surrounding said electrical contacts for preventing liquid from the sides reaching said contacts.

6. In a device of the class described, a refractory plate or block, a heating element carried thereby, a mounting for said plate carrying electrical contacts adapted to be connected to a source of current, a plurality of electrical terminals for said heating element adapted to make electrical connection with said contacts, and cups surrounding said electrical contacts for preventing liquid from the sides reaching said contacts, said plate being removably secured to said mounting by a threaded connection.

In testimony whereof, I have hereunto set my hand this 17th day of September, 1928.

ROSCOE S. HEISE.